May 6, 1958 B. D. LOUGHLIN 2,833,851

COLOR-TELEVISION SIGNAL-MODIFYING APPARATUS

Filed Aug. 4, 1954 2 Sheets-Sheet 1

May 6, 1958 B. D. LOUGHLIN 2,833,851

COLOR-TELEVISION SIGNAL-MODIFYING APPARATUS

Filed Aug. 4, 1954 2 Sheets-Sheet 2

United States Patent Office 2,833,851

Patented May 6, 1958

2,833,851

COLOR-TELEVISION SIGNAL-MODIFYING APPARATUS

Bernard D. Loughlin, Lynbrook, N. Y., assignor to Hazeltine Research, Inc., Chicago, Ill., a corporation of Illinois Application August 4, 1954, Serial No. 447,761

14 Claims. (Cl. 178—5.2)

Figure 1:
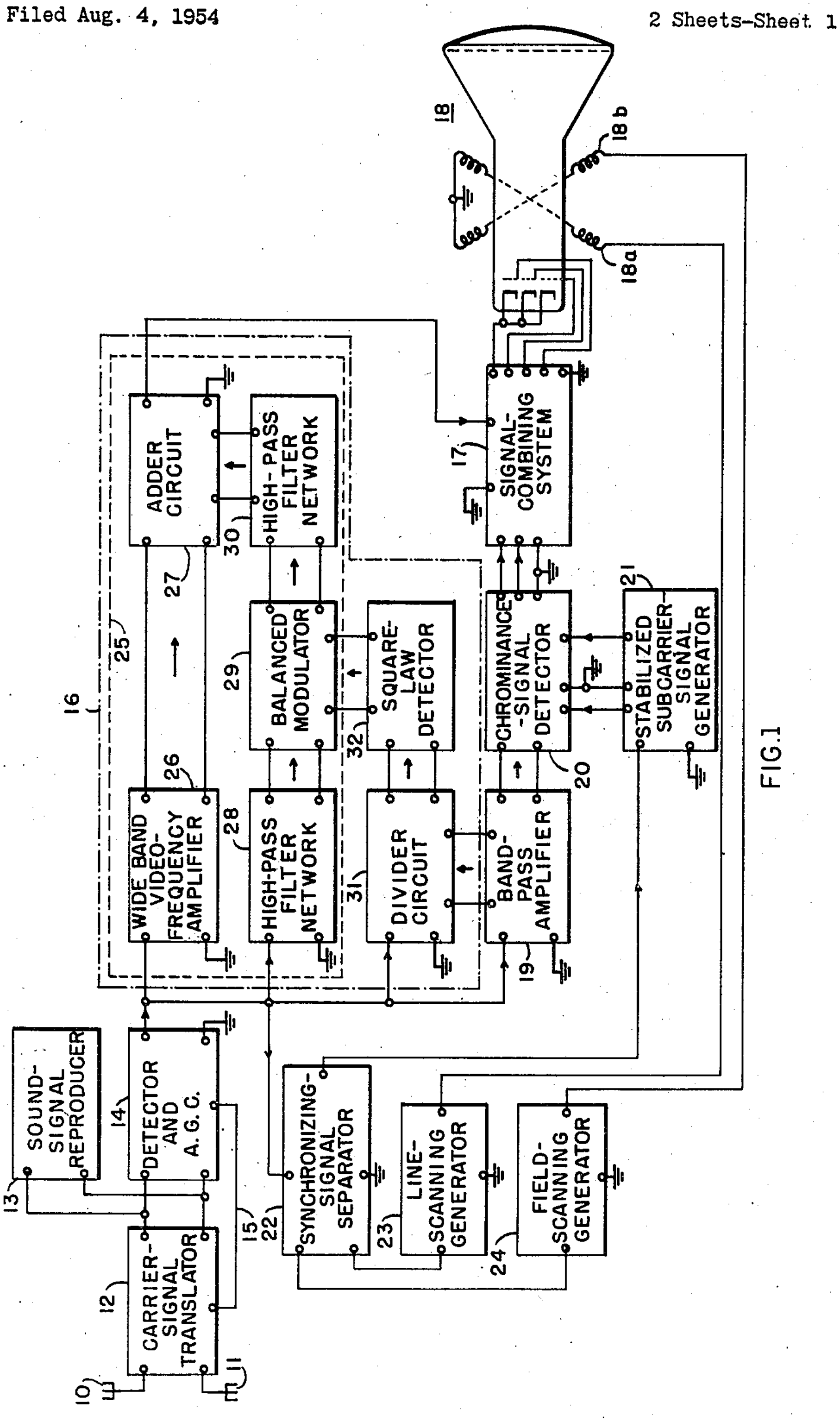

This invention relates to color-television signal-modifying apparatus, and particularly, to such apparatus for modifying the color-television signal to improve the quality of the reproduced color image.

In accordance with the FCC approved NTSC signal specification described on pages 17–19 of the January 1954 issue of the Proceedings of the IRE, the composite color television signal shall include luminance- and chrominance-signal components, the chrominance-signal component being carried as amplitude and phase modulation of a 3.58 megacycle subcarrier signal. As mentioned in an article entitled "The constant luminance principle in NTSC color television," by W. F. Bailey, and appearing at page 60 of the January 1954 issue of the Proceedings of the IRE, the NTSC signal standard is such that constant luminance operation of color-television receivers is obtained. For purposes of brief explanation only and without intent to limit or define, by constant luminance operation is meant that signals in the chrominance channel of the color receiver shall not affect the luminance of the reproduced color image, or in other words, that the reproduced luminance shall not be affected by the chrominance-signal component. This type of operation is desired because it has been found that the human eye is more sensitive to undesired brightness or luminance variations than it is to undesired color variations.

The NTSC signal specification also provides that the luminance- and chrominance-signal components shall be gamma-corrected at the transmitter. According to current practice, therefore, the signal components are predistorted at the transmitter in order to compensate for the nonlinearity of present day receiver picture tubes. There are two known ways in which the gamma-corrected luminance-signal component might be developed at the transmitter. In one system, the individual color signals are individually gamma-corrected and these gamma-corrected color signals are then combined in the proper proportions to produce the luminance signal. This type of luminance signal is commonly denoted by the symbol $E_y'$ and is the one commonly used in current practice. In accordance with the other system of gamma correction, the luminance signal is developed first by combining the individual color signals and then the resultant luminance signal is gamma-corrected. This type of gamma-corrected luminance signal is commonly denoted by the symbol $E_y^{1/\gamma}$. This second system is the more ideal one in that all the luminance information is carried by the luminance signal. For the first system, most of the luminance information is carried by the luminance signal, but some luminance information is carried by the chrominance signal and the amount so carried increases as the colors become more saturated. As mentioned, however, current practice favors the first or $E_y'$ type of luminance signal.

As pointed out in the prior art, transmission of the $E_y'$ luminance signal produces ill effects due to the limited pass band of the chrominance channel in both the transmitting and receiver equipment. Because of the limited pass band of the chrominance channel, the high-frequency portion of the luminance information carried by the chrominance signal is lost. As a result, when the chrominance and luminance signals are combined in the conventional color receiver, the total high-frequency luminance information has, in effect, been attenuated with respect to the low-frequency portion of the luminance information. This results in a certain amount of degradation in the quality of the reproduced color image. This degradation may be thought of as a loss of fine detail luminance information in the reproduced image.

The literature describes a signal-modifying or luminance-correction apparatus for correcting for the loss of high-frequency luminance information in which equipment is utilized at the transmitter to simulate a typical receiver so as to develop a high-frequency-deficient luminance signal and then to subtract this deficient luminance signal from a correct luminance signal also developed at the transmitter to obtain a correction signal which is then utilized to predistort the transmitted luminance signal to compensate for the deficiency in high-frequency luminance information. This system uses far more circuitry than is necessary or desirable.

It is an object of the invention, therefore, to provide new and improved color-television signal-modifying apparatus which avoids the foregoing limitations of systems heretofore proposed.

It is another object of the invention to provide new and improved color-television signal-modifying apparatus of relatively simple construction for improving the quality of the reproduced color image.

It is a further object of the invention to provide new and improved color-television signal-modifying apparatus for improving the quality of the reproduced color image and which is capable of utilizing the color-television signals favored by current practice.

In accordance with the invention, color-television apparatus for translating a wide band luminance component and a reduced band width chrominance component of a video-frequency composite color-television signal, which chrominance component tends to affect the reproduced luminance and thereby to degrade the fine detail of a color image when utilized in a color-television receiver together with the luminance component to reproduce the more saturated colors, comprises circuit means for translating the luminance component and having a controllable gain characteristic for modifying the amplitude of the high-frequency portion of the luminance component relative to the amplitude of the low-frequency portion of the luminance component. The signal-modifying apparatus also includes circuit means for supplying a second component of the color-television signal representative of the chrominance of the color image. The signal-modifying apparatus further includes control circuit means responsive to the chrominance component for controlling the gain characteristic of the first circuit means to modify the high-frequency portion of the luminance component in accordance with the saturation of the color to correct for the tendency to degrade the fine detail of a color image reproduced by the color receiver.

For a better understanding of the present invention, together with other and further objects thereof, reference is had to the following description taken in connection with the accompanying drawings, and its scope will be pointed out in the appended claims.

Figures 2, 3:
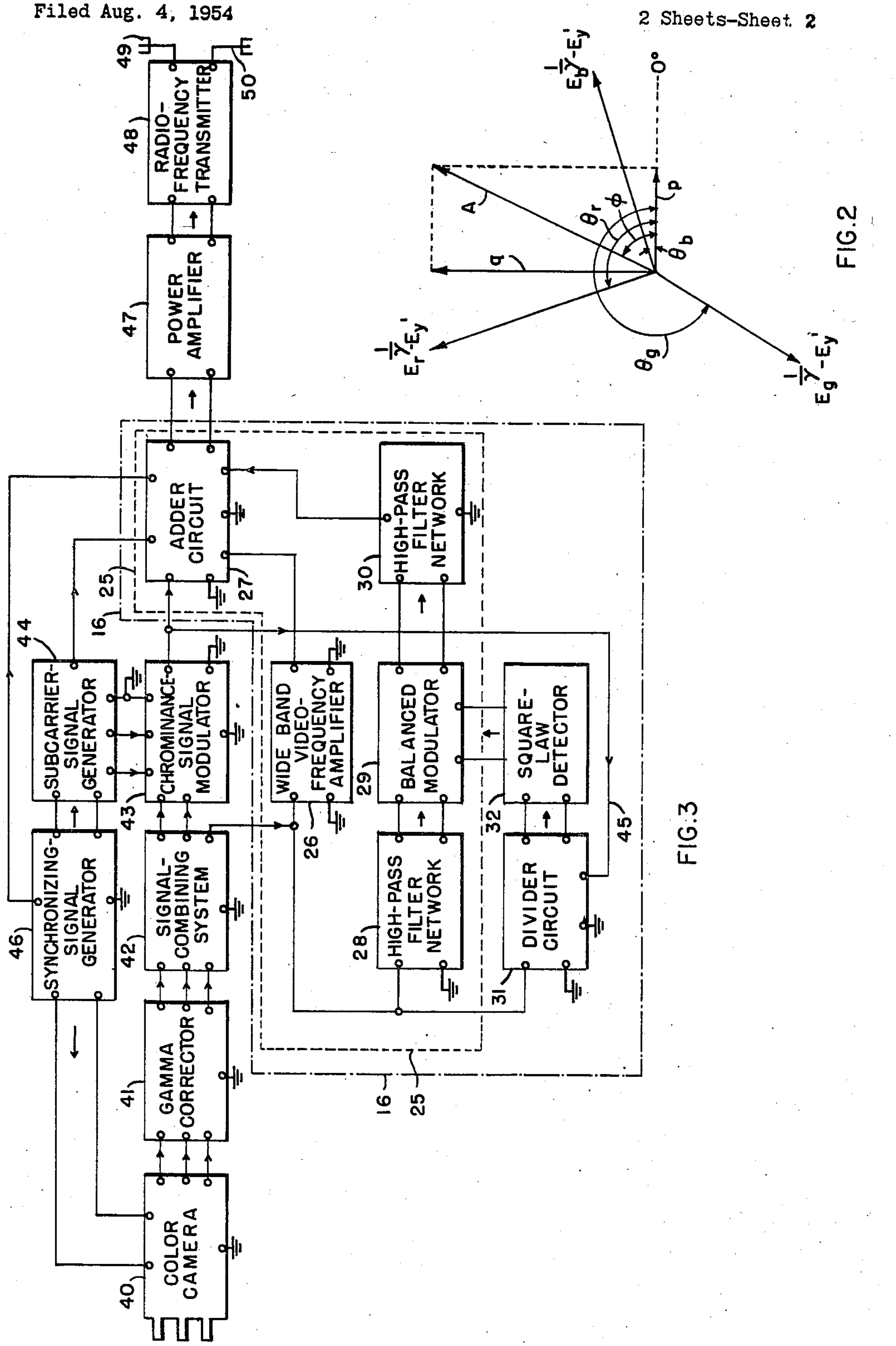

Referring to the drawings:

Fig. 1 is a circuit diagram, partly schematic, of a complete color-television receiver including signal-modifying apparatus constructed in accordance with the present invention, Fig. 2 is a vector diagram used in explaining the operation of the signal-modifying apparatus of Fig. 1, and Fig. 3 is a circuit diagram of a complete color-television transmitter including signal-modifying apparatus constructed in accordance with the present invention.

*Description and operation of Fig. 1 color-television receiver*

Referring to Fig. 1 of the drawings, the color-television receiver there represented comprises an antenna system 10, 11 of conventional construction for supplying a received composite color-television signal to a carrier-signal translator 12. The carrier-signal translator 12 may include, for example, a radio-frequency amplifier, an oscillator-modulator, and an intermediate-frequency amplifier, all of conventional construction. These units serve to amplify the received composite signal and change its carrier frequency to an intermediate-frequency value. The intermediate-frequency composite signal is in turn supplied to a sound signal reproducer 13 which is effective to extract the sound carrier therefrom, detect the audio component thereof, and utilize the same to reproduce sound. To this end, the sound-signal reproducer 13 may include a sound intermediate-frequency amplifier, a frequency-modulation signal detector, an audio-frequency amplifier, and a loudspeaker, all of conventional construction.

The intermediate-frequency composite signal is also supplied to a detector and AGC unit 14 of conventional construction. The AGC portion of unit 14 is effective to supply a control voltage to appropriate stages of the carrier-signal translator 12 by means of conductor 15 for controlling the gain of those stages in a conventional manner. The detector portion of unit 14 serves to extract the composite video-frequency signal from the intermediate-frequency composite signal and supply the composite video signal to signal-modifying apparatus 16 constructed in accordance with the present invention as will be described more fully hereinafter. The signal-modifying apparatus 16 translates the luminance-signal component of the composite video signal to a conventional signal-combining system 17.

The color-television receiver also includes a chrominance-signal channel for translating the chrominance-signal component of the composite video signal supplied by the detector 14, the chrominance-signal channel including a band-pass amplifier 19, of conventional construction, which in turn is coupled in cascade with a chrominance-signal detector 20 and a portion of the signal-combining system 17. The chrominance-signal detector may include, for example, a pair of synchronous detectors for deriving the desired red and blue color-difference signals from the chrominance signal supplied thereto by the band-pass amplifier 19. Coupled to the chrominance-signal detector 20 is a stabilized subcarrier-signal generator 21 which is effective to supply properly phased subcarrier reference signals to the synchronous detectors of the chrominance-signal detector 20 for enabling the detection of the color-difference signals. The color-difference signals from the detector 20 are supplied to the signal-combining system 17 which is effective to combine the color-difference signals and luminance signal to derive the desired red, green, and blue color signals which in turn are supplied to the corresponding control electrodes of the picture tube 18.

The composite video signal from the detector 14 is also supplied to a synchronizing-signal separator 22 which is effective to separate the subcarrier-synchronizing, the line-synchronizing, and field-synchronizing signal components from the composite video signal and from each other. The line-synchronizing component is supplied to a conventional line-scanning generator 23 and is effective to control generation of suitable recurrent line-scanning signals therein. The line-scanning signals are in turn supplied to an appropriate horizontal deflection winding **18*a* associated with the picture tube 18. In a like manner, the field-synchronizing signals are supplied to a conventional field-scanning generator 24 and are effective to control generation of field-scanning signals therein which in turn are supplied to an appropriate vertical deflection winding 18*b* also associated with the picture tube 18. The subcarrier-synchronizing component is supplied to the subcarrier-signal generator 21** in order to properly synchronize the phase of the subcarrier reference signals generated therein.

The antenna system 10, 11 and the units 12–24, inclusive, with the exception of the signal-modifying apparatus 16 may be of conventional construction and operation so that a detailed description and explanation of the operation thereof are unnecessary herein.

*Description of signal-modifying apparatus of Fig. 1*

Referring to Fig. 1 of the drawings, there is represented signal-modifying apparatus 16 constructed in accordance with the present invention comprising circuit means 25 for translating the luminance component of the composite video signal and having a controllable gain characteristic for modifying the amplitude of the high-frequency portion of the luminance component relative to the amplitude of the low-frequency portion of the luminance component. The luminance-component translating-circuit means 25 or, more simply, the luminance channel 25 may include, for example, a first channel for translating the luminance component which includes a wide band video-frequency amplifier 26 and an adder circuit 27. The luminance channel 25 may also include, for example, a second channel for translating the high-frequency portion of the luminance component and comprising, coupled in cascade, a high-pass filter network 28, a balanced modulator 29, and another high-pass filter network 30 which is coupled to the adder circuit 27 of the first channel. The balanced modulator 29 may be of a conventional type where a pair of input signals may be supplied to a pair of tubes to produce in the output circuit an output signal that is proportional to the product of the input signals.

The signal-modifying apparatus 16 also includes circuit means for supplying a second component of the composite color-television signal representative of the chrominance of the color image. This chrominance-component supply-circuit means may include, for example, an output circuit of the band-pass amplifier 19 of the chrominance-signal channel.

The signal-modifying apparatus 16 further includes control circuit means responsive to the chrominance component for controlling the gain characteristic of the first circuit means or luminance channel 25 to modify the high-frequency portion of the luminance component in accordance with the saturation of the color to correct for the tendency to degrade the fine detail of a color image reproduced by the color receiver. The control circuit means may include, for example, a divider circuit 31 jointly responsive to the amplitudes of the luminance and chrominance components for developing a ratio signal representative of the ratio of the amplitudes of these components. The control circuit means may also include a squaring circuit 32 coupled to the output of the divider 31 and responsive to the ratio signal for controlling the gain characteristic of, for example, the modulator circuit 29 in accordance with the square of the ratio signal to modify the high-frequency portion of the luminance component in accordance with the saturation of the color. The divider circuit 31 may comprise, for example, a conventional tube circuit having a pair of input electrodes and biased so that one input-to-output electrode transfer characteristic is such that an input signal supplied to the one input electrode produces a signal component in the output circuit that is proportional to the reciprocal of the one input signal, while a signal supplied to the other input electrode produces a signal directly proportional to the other input signal. The squaring circuit 32 may comprise a conventional square-law detector for detecting the amplitude variations of the envelope of the subcarrier-frequency ratio signal supplied thereto by the divider circuit 31 and to develop an output signal proportional to the square of the ratio signal. The output circuit of the square-law detector 32 is coupled to the input electrode of the balanced modulator 29 for controlling the gain thereof to modify the high-frequency portion of the luminance component supplied to the other input electrode thereof in accordance with the square of the ratio signal.

As mentioned, the luminance channel 25 may include, for example, the adder circuit 27 for adding the high-frequency portion of the luminance-signal component translated by the second channel with the luminance component translated by the first channel to correct for the tendency to degrade the fine detail of the reproduced color image.

Each of the units 26–32, inclusive, of the signal-modifying apparatus 16, taken individually and without reference to its use in the present system, may be of conventional construction so that a detailed description and explanation of the individual internal operations of the separate units are unnecessary herein.

*Operation of signal-modifying apparatus of Fig. 1*

As mentioned, the loss of high-frequency or fine detail luminance information due to transmission of the $E_y'$ luminance signal and the limited pass band of the chrominance channel causes degradation of the quality of the reproduced color image. To evaluate mathematically the loss in fine detail, the following symbols shall be used:

$E_y$=a voltage representative of the intended luminance of the scene to be televised $E_{y0}$=a voltage representative of the luminance of the color image reproduced by the receiver $E_r$=the red signal voltage produced by the color camera $E_g$=the green signal voltage produced by the color camera $E_b$=the blue signal voltage produced by the color camera In accordance with current practice of the NTSC signal specification, the transmitted luminance signal $E_y'$ is:

$$E_y'=0.30E_r^{1/\gamma}+0.59E_g^{1/\gamma}+0.11E_b^{1/\gamma} \quad (1)$$

where $\gamma$ (gamma) represents the nonlinear relationship between the color signal supplied to the receiver picture tube and the corresponding reproduced luminance. Denoting the color signals as fractions of the luminance voltage $E_y$ gives $$E_r=rE_y \quad (2)$$
$$E_g=gE_y \quad (3)$$
$$E_b=bE_y \quad (4)$$

Substituting Equations 2, 3, and 4 into Equation 1 gives $$E_y'=E_y^{1/\gamma}(0.30r^{1/\gamma}+0.59_g^{1/\gamma}+0.11b^{1/\gamma} \quad (5)$$

Now differentiating Equation 5 with respect to $E_y$ at constant chrominance, i. e., for constant hue and saturation, gives $$\frac{dE_y}{dE_y}=\frac{1}{\gamma}\cdot\frac{E_y^{1/\gamma}}{E_y}(0.30r^{1/\gamma}+0.59g^{1/\gamma}+0.11b^{1/\gamma} \quad (6)$$

the quantity in parenthesis being a constant for constant chrominance. Now simplifying Equation 6 by means of Equation 5 results in $$\frac{dE_y'}{dE_y}=\frac{1}{\gamma}\cdot\frac{E_y'}{E_y} \quad (7)$$

The quantity $$\frac{dE_y'}{dE_y}$$

denotes the rate of change of the transmitted luminance signal $E_y'$ with respect to the voltage signal $E_y$ representative of the luminance of the scene to be televised and represents the ability of the luminance-signal component $E_y'$ of the signal radiated by the transmitter to convey fine detail luminance information.

For conventional present-day color receivers, the output or reproduced luminance, expressed in terms of a voltage, is $$E_{y0}=0.30(E_r^{1/\gamma})^\gamma+0.59(E_g^{1/\gamma})^\gamma+0.11(E_b^{1/\gamma})^\gamma \quad (8)$$

The ability of the receiver to reproduce fine detail luminance information is represented by the derivative of $E_{y0}$ with respect to the received luminance signal $E_y'$. Thus, $$\frac{dE_{y0}}{dE_y'}=0.30\gamma(E_r^{1/\gamma})^{\gamma-1}\frac{d(E_r^{1/\gamma})}{dE_y'}+0.59\gamma(E_g^{1/\gamma})^{\gamma-1}\frac{d(E_g^{1/\gamma})}{dE_y'}+0.11\gamma(E_b^{1/\gamma})^{\gamma-1}\frac{d(E_b^{1/\gamma})}{dE_y'} \quad (9)$$

For the conventional color receiver, the properly decoded red, green, and blue color signals may be expressed by the following relations:

$$E_r^{1/\gamma}=E_y'+(E_r^{1/\gamma}-E_y') \quad (10)$$
$$E_g^{1/\gamma}=E_y'+(E_g^{1/\gamma}-E_y') \quad (11)$$
$$E_b^{1/\gamma}=E_y'+(E_b^{1/\gamma}-E_y') \quad (12)$$

Recognizing that the terms in parentheses in Equations 10, 11, and 12 are the narrow band-width color-difference signals and limiting the differential $dE_y'$ to represent high-frequency luminance information, such as that which is not passed by the narrow-band chrominance channel, then $$\frac{d(E_r^{1/\gamma})}{dE_y'}=\frac{d(E_g^{1/\gamma})}{dE_y'}=\frac{d(E_b^{1/\gamma})}{dE_y'}=1 \quad (13)$$

Substituting the relations of Equation 13 into Equation 9 permits simplification of Equation 9 to $$\frac{dE_{y0}}{dE_y'}=\gamma[0.30(E_r^{1/\gamma})^{\gamma-1}+0.59(E_g^{1/\gamma})^{\gamma-1}+0.11(E_b^{1/\gamma})^{\gamma-1}] \quad (14)$$

The quantity $$\frac{dE_{y0}}{dEy'}$$

denotes the ability of the receiver to reproduce the fine detail luminance information contained in the received luminance signal $E_y'$.

The over-all transmission of fine detail luminance information is represented by the quantity $$\frac{dE_{y0}}{dE_y}$$

where $$\frac{dE_{y0}}{dE_y}=\frac{dE_y'}{dE_y}\cdot\frac{dE_{y0}}{dE_y'} \quad (15)$$

which represents the rate of change of reproduced luminance with the respect to luminance of the televised scene. It will be noted that this quantity is equal to the product of the transmitter and receiver fine detail transmission factors of Equations 7 and 14. Ideally, where the quantities $E_y$, $E_{y0}$, and $E_y'$ are individually normalized with respect to the signal-amplification factors between the points in the system where the individual signals occur to eliminate differences due solely to differences in absolute signal level, the quantity $$\frac{dE_{y0}}{dE_y}$$

should be equal to unity. Departure of this quantity from unity indicates the over-all loss of fine detail luminance information. Substituting Equations 7 and 14 into Equation 15 and assuming that $\gamma=2$, which is fairly accurate for present-day picture tubes, gives $$\frac{dE_{y0}}{dE_y}=\frac{E_y'}{E_y}(0.30E_r^{1/\gamma}+0.59E_g^{1/\gamma}+0.11E_b^{1/\gamma}) \quad (16)$$

Utilizing the relationship of Equation 1, Equation 16 reduces to $$\frac{dE_{y0}}{dE_y}=\frac{(E_y')^2}{E_y} \qquad (17)$$

Remembering that $\gamma=2$, Equation 17 may be written in the form $$\frac{dE_{y0}}{dE_y}=\left(\frac{E_y'}{E_y^{1/\gamma}}\right)^2 \qquad (18)$$

As mentioned, the departure of the quantity $$\frac{dE_{y0}}{dE_y}$$

of Equation 18 from unity represents the over-all loss of fine detail or high-frequency luminance information due to transmission of the $E_y'$ luminance signal and the limited bond width of the chrominance channel.

The factor $Ey^{1/\gamma}$ represents the previously mentioned ideal type of luminance signal wherein all the luminance information is carried by the luminance signal. This type of luminance signals is represented mathematically by $E_y^{1/\gamma}=(0.30E_r+0.59E_g+0.11E_b)^{1/\gamma}$. Comparing this expression with the expression of Equation 1 for the transmitted $E_y'$ luminance signal shows that $E_y'$ is equal to $E_y^{1/\gamma}$ for the neutral colors near white because the values of $E_r$, $E_g$, and $E_b$ in either expression are approximately equal to each other. Equation 18 indicates that no loss of luminance information occurs for these neutral colors. But, as $E_y'$ becomes increasingly less than $E_y^{1/\gamma}$ as the colors approach saturation, Equation 18 indicates that the loss of luminance information increases as the colors approach saturation. To correct for this loss of fine detail information, it is necessary to translate the high-frequency portion of the $E_y'$ luminance signal relative to the low-frequency portion thereof by the factor $$\left(\frac{E_y^{1/\gamma}}{E_y'}\right)^2 \qquad (18a)$$

This correction may be performed at either the transmitter or the receiver.

The correction factor (18*a*) completely indicates the nature of the desired correction which is necessary to correct for the loss of fine detail luminance information, but factor (18*a*) includes the quantity $E_y^{1/\gamma}$ which is not normally present at either the transmitter or receiver of a color-television system constructed in accordance with current practice. As will now be indicated, the correction factor (18*a*) may be expressed in terms of signals which are normally and conveniently available in either a transmitter or a receiver constructed in accordance with current practice.

Referring now to Fig. 2 of the drawings, the chrominance signal is an amplitude- and phase-modulated subcarrier signal and is represented by the vector A of Fig. 2, "A" denoting the amplitude and $\phi$ the phase of the chrominance signal. The amplitude A is representative of the saturation and the phase $\phi$ is representative of the hue of the corresponding color reproduced on the display screen. For convenience, the chrominance signal A is sometimes thought of in terms of a pair of quadrature components $p$ and $q$ as shown in Fig. 2.

As mentioned, the chrominance signal is demodulated by synchronous detectors which individually derive the desired red and blue color-difference signals therefrom. The output signal of each synchronous detector is proportional to the amplitude variations of a predetermined phase component of the chrominance signal times the gain of the particular synchronous detector. The green color-difference signal may be obtained by suitably inverting and combining the red and blue color-difference signals in the signal-combining unit 17 of Fig. 1. For ease of explanation in deriving the following relations, however, it is convenient to consider the green color-difference signal as being derived by a third synchronous detector in the chrominance-signal detector unit 20 of Fig. 1.

Assuming, for example, arbitrary demodulator gain factors of $a_r$, $a_g$, and $a_b$ and arbitrary demodulation angles of $\theta_r$, $\theta_g$, and $\theta_b$ where the subscripts *r, g,* and *b* denote red, green, and blue, respectively, then the color-difference signals from the corresponding synchronous detectors are:

$$E_r^{1/\gamma}-E_y'=a_rA\cos(\theta_r-\phi) \qquad (19)$$

$$E_g^{1/\gamma}-E_y'=a_gA\cos(\theta_g-\phi) \qquad (20)$$

$$E_b^{1/\gamma}-E_y'=a_bA\cos(\theta_b-\phi) \qquad (21)$$

where the quantity $E_r^{1/\gamma}-E_y'$ denotes the red color-difference signal and the corresponding quantities for green and blue denote the green and blue color-difference signals.

The color signals are obtained from the color-difference signals by combining each color-difference signal with the luminance signal, thus:

$$E_r^{1/\gamma}=E_y'+a_rA\cos(\theta_r-\phi) \qquad (22)$$

$$E_g^{1/\gamma}=E_y'+a_gA\cos(\theta_g-\phi) \qquad (23)$$

$$E_b^{1/\gamma}=E_y'+a_bA\cos(\theta_b-\phi) \qquad (24)$$

Each of these color signals controls the luminance from its respective phosphor on the inner face of the picture tube by the following relations:

$$Y_r=L_r(E_r^{1/\gamma})^\gamma \qquad (25)$$

$$Y_g=L_g(E_g^{1/\gamma})^\gamma \qquad (26)$$

$$Y_b=L_b(E_b^{1/\gamma})^\gamma \qquad (27)$$

where Y denotes the reproduced luminance and L represents a proportionality constant. The total reproduced luminance is determined by the relation:

$$Y=Y_r+Y_g+Y_b \qquad (28)$$

By substituting the values of $Y_r$, $Y_g$, and $Y_b$ from Equations 25, 26, and 27 into Equation 28, and in turn substituting the values of $E_r^{1/\gamma}$, $E_g^{1/\gamma}$, and $E_b^{1/\gamma}$ from Equations 22, 23, and 24 into the result, and, finally, dividing both sides by $(E_y')^\gamma$ gives $$\frac{Y}{(E_y')^\gamma}=L_r\left[1+\frac{a_rA}{E_y'}\cos(\theta_r-\phi)\right]^\gamma+L_g\left[1+\frac{a_gA}{E_y'}\cos(\theta_g-\phi)\right]^\gamma+L_b\left[1+\frac{a_bA}{E_y'}\cos(\theta_b-\phi)\right]^\gamma \qquad (29)$$

The quantity $$\frac{Y}{(E_y')^\gamma}$$

represents the ratio of the total luminance Y produced on the display screen of the picture tube to the luminance contributed by the luminance signal $E_y'$. This same ratio is also derived in the previously mentioned Bailey article but in terms of the quadrature components $p$ and $q$ instead of in terms of the chrominance signal A itself which is more convenient for present purposes.

Assuming that $\gamma=2$, which, as mentioned, is fairly accurate for present-day picture tubes, then squaring the terms on the right-hand side of Equation 29 and regrouping the terms and remembering that $L_r$, $L_g$, and $L_b$ may be selected so that $L_r+L_g+L_b=1$ gives:

$$\frac{Y}{(E_y')^\gamma}=1+2\frac{A}{E_y'}[L_ra_r\cos(\theta_r-\phi)+L_ga_g\cos(\theta_g-\phi)+L_ba_b\cos(\theta_b-\phi]+\left(\frac{A}{E_y'}\right)^2[L_ra_r^2\cos^2(\theta_r-\phi)+L_ga_g^2\cos^2(\theta_g-\phi)+L_ba_b^2\cos^2(\theta_b-\phi)] \qquad (30$$

As indicated in the Bailey article, the linear $$\frac{A}{E_y}$$

term in Equation 30 is made equal to zero in order to obtain first-order constant luminance operation in the receiver. Thus, the coefficient of the $$\frac{A}{E_y'}$$

term is made equal to zero, i. e., $$L_r a_r \cos(\theta_b - \phi) + L_g a_g \cos(\theta_g - \phi) + L_b a_b \cos(\theta_b - \phi) = 0 \quad (31)$$

This quantity is made equal to zero by properly selecting the gain factors $a_r$, $a_g$, and $a_b$ and the demodulation angles $\theta_r$, $\theta_g$, and $\theta_b$. Actually, this result is implicit in the NTSC signal standard, i. e., when a receiver is properly designed to utilize the signal components specified by the NTSC standard, first-order constant luminance, as indicated by the relationship of Equation 31, is obtained.

Assuming the $$\frac{A}{E_y'}$$

term of Equation 30 is zero in accordance with Equation 31, then by expanding the $\cos^2$ terms of Equation 30 by the proper trigonometric identities and collecting the resulting terms as coefficients of the $\phi$ terms, Equation 30 becomes $$\frac{Y}{(E_y')^\gamma} = 1 + \left(\frac{A}{E_y'}\right)^2 (K_1 \cos^2 \phi + K_2 \sin 2\phi + K_3 \sin^2 \phi) \quad (32)$$

where $$K_1 = L_r a_r^2 \cos^2 \theta_r + L_g a_g^2 \cos^2 \theta_g + L_b a_b^2 \cos^2 \theta_b \quad (33)$$

$$K_2 = \tfrac{1}{2} L_r a_r^2 \sin 2\theta_r + \tfrac{1}{2} L_g a_g^2 \sin 2\theta_g + \tfrac{1}{2} L_b a_b^2 \sin 2\theta_b \quad (34)$$

$$K_3 = L_r a_r^2 \sin^2 \theta_r + L_g a_g^2 \sin^2 \theta_g + L_b a_b^2 \sin^2 \theta_b \quad (35)$$

It will be noticed that the constants $K_1$, $K_2$, and $K_3$ are determined by the fixed factors $a_r$, $a_g$, and $a_b$ and $\theta_r$, $\theta_g$, and $\theta_b$. Thus, by properly selecting the values $a_r$, $a_g$, and $a_b$ and $\theta_r$, $\theta_g$, and $\theta_b$, the following relations may be established:

$$K_1 = K_3 = K \quad (36)$$

$$K_2 = 0 \quad (37)$$

When the values of $a_r$, $a_g$, $a_b$ and $\theta_r$, $\theta_g$, $\theta_b$ are selected to satisfy Equations 36 and 37 as well as the condition for first-order constant luminance indicated by Equation 31, then the condition for "circular subcarrier" or "circular chrominance" is obtained as is mentioned in the Bailey article. The term "circular subcarrier" denotes the condition where the reproduced luminance is independent of the phase $\phi$ of the chrominance subcarrier signal A.

Substituting Equations 36 and 37 into Equation 32 gives:

$$\frac{Y}{(E_y')^\gamma} = 1 + K\left(\frac{A}{E_y'}\right)^2 (\cos^2\phi + \sin^2 \phi) \quad (38)$$

which reduces by use of the proper trigonometric identity to $$\frac{Y}{(E_y')^\gamma} = 1 + K\left(\frac{A}{E_y'}\right)^2 \quad (39)$$

Equation 39 indicates that the total reproduced luminance Y differs from the luminance $(E_y')^\gamma$ contributed by the luminance signal $E_y'$ by the $$K\left(\frac{A}{E_y'}\right)^2$$

factor which will be hereinafter referred to as the $A^2$ factor. Equation 39, of course, is only strictly correct where "circular subcarrier" operation is used. The present NTSC signal specification permits approximate, but not precise, "circular subcarrier" operation. The approximation, however, is sufficiently close to assume that Equation 39 holds for receivers designed to utilize the NTSC signal. Where very precise operation is desired, suitable circuitry may be used in the receiver to transform the received chrominance subcarrier signal to an exact "circular subcarrier" signal.

By restating the total reproduced luminance quantity Y of Equation 39 in terms of its corresponding electrical equivalent $(E_y^{1/\gamma})^\gamma$ and remembering that $\gamma=2$, Equation 39 may be restated as $$\left(\frac{E_y^{1/\gamma}}{E_y'}\right)^2 = 1 + K\left(\frac{A}{E_y'}\right)^2 \quad (40)$$

By comparing Equation 40 with the desired correction factor (18*a*), it will be seen that the quantity on the right-hand side of Equation 40 expresses the desired correction factor in terms of the chrominance subcarrier signal A and the luminance signal $E_y'$, both of which are already available at either the transmitter or the receiver. It will be noted that the unity factor on the right-hand side of Equation 40 indicates the condition for uniform translation of luminance information, while the $A^2$ factor indicates the relative boost of the fine detail or high-frequency luminance information which must be used to compensate for the previously mentioned loss of some of the fine detail luminance information.

As mentioned, the loss of high-frequency information is due to the fact that the high-frequency luminance information which is undesirably carried by the chrominance signal is lost during translation of the chrominance signal through the chrominance channel because of the limited pass band thereof, thus resulting in an undesired over-all loss of high-frequency luminance information which manifests itself as a loss of fine detail in the reproduced color image. It will be noticed from Equation 40 that the amount of luminance information carried by the chrominance signal and hence, the amount of fine detail that is lost increases as the square of the amplitude A of the chrominance signal increases or, in other words, it increases rapidly as the color approaches saturation. The $A^2$ factor of Equation 40, however, also indicates the nature of the correction signal that may be utilized to correct for this loss of high-frequency luminance information. More precisely, it is proposed to increase the gain of the high-frequency portion of the $E_y'$ luminance signal translated by the luminance channel 25 in order to make up for this deficiency in total high-frequency luminance information. As the $A^2$ factor of Equation 40 indicates the loss of high-frequency luminance information, the gain of the high-frequency portion of the $E_y'$ luminance signal translated by the luminance channel 25 should be increased in accordance with this same $A^2$ factor.

One means of achieving the desired correction is illustrated by the specific apparatus of Fig. 1. For example, the $E_y'$ luminance signal is supplied through the video-frequency amplifier 26 to an adder circuit 27. The high-frequency portion of this luminance signal is also supplied through the high-pass filter network 28 to the balanced modulator 29 which is effective to achieve the desired modification of the high-frequency portion. The modified high-frequency portion is in turn supplied through the high-pass filter network 30 to the adder circuit 27 so that the modified high-frequency luminance component is added to the $E_y'$ luminance signal supplied by the amplifier 26 to obtain the desired luminance signal including the "boosted" high-frequency portion.

To develop the $A^2$ correction factor the luminance signal $E_y'$ is also supplied to the divider circuit 31 as is the chrominance signal A. The divider circuit 31 is effective, in a conventional manner, to develop a signal proportional to the ratio of the chrominance signal A to the luminance signal $E_y'$. This $$\frac{A}{E_y'}$$

ratio signal is in turn supplied to the square-law detector 32 which serves to detect the amplitude variations of the envelope of the subcarrier frequency ratio signal to develop a video-frequency signal proportional to the square of the ratio signal, thus developing the desired control signal $$\left(\frac{A}{E_y'}\right)^2$$

This control signal is in turn supplied to the balanced modulator 29 to control the gain characteristics thereof in accordance with the control signal.

As mentioned, correction of the high-frequency portion of the luminance signal may be performed at the transmitter instead of at the receiver, as will presently be discussed. Correction at the transmitter may be preferable from the standpoint of receiver cost, but the effect of the reception of a corrected luminance signal on the picture produced by a monochrome receiver must be taken into consideration.

*Description and operation of Fig. 3 color-television transmitter*

Referring now to Fig. 3 of the drawings, there is represented a complete color-television transmitter including signal-modifying apparatus 16 constructed in accordance with the present invention. The transmitter includes a color camera 40 for picking up information representative of the three primary colors of the scene to be televised and converting this information into, for example, corresponding electrical red, green, and blue color signals. The red, green, and blue color signals are, in turn, supplied to a gamma corrector 41 which serves to predistort the color signals by a predetermined amount in order to compensate for the non-linearity of the picture tubes of color-television receivers. The gamma-corrected color signals are then supplied to a signal-combining system 42 which may include, for example, suitable matrixing circuits for combining the three signals and deriving therefrom the desired color-difference signals and the desired luminance signal.

The color-difference signals are then supplied to a chrominance-signal modulator 43. A subcarrier-signal generator 44 also supplies signals of the subcarrier frequency, for example, 3.58 megacycles to the chrominance-signal modulator 43. The chrominance-signal modulator 43 is responsive to these signals to produce the amplitude- and phase-modulated subcarrier signal which is then supplied to the adder circuit 27 of the signal-modifying apparatus 16. By means of the amplitude and phase modulation thereof, the subcarrier signal conveys complete information as to the color qualities of the televised scene.

The luminance signal developed in the signal-combining system 42 is supplied to the signal-modifying apparatus 16 of the present invention which will be discussed in more detail hereinafter. The signal-modifying apparatus 16, however, is effective to modifying the luminance signal in a desired manner and to supply the modified signal to the adder circuit 27.

A synchronizing-signal generator 46 supplies line- and field-synchronizing signals to the color camera 40 for enabling the color camera 40 properly to scan the televised scene. The synchronizing-signal generator 46 also supplies line- and field-scanning signals to the adder circuit 27. The subcarrier signal generator 44 also supplies a short burst of subcarrier signal to the adder circuit 27 just after the occurrence of each line-scanning synchronizing signal supplied by the generator 46. This operation is controlled by line-synchronizing signals from the generator 46. These periodic bursts of subcarrier signal will be subsequently utilized in the receiver to synchronize the chrominance-signal detector thereof.

The adder circuit 27 is responsive to all the signals supplied thereto to develop the complete video-frequency composite color-television signal. This composite color-television signal is, in turn, supplied by the adder circuit 27 to a power amplifier 47 which is effective to amplify the composite signal which, in turn, is supplied to a radio-frequency transmitter 48 wherein it serves to modulate the radio-frequency carrier signal which is then radiated by an antenna system 49, 50.

The units 40–44, inclusive, 46–48, inclusive, and the antenna system 49, 50 may be of conventional construction so that a detailed description and explanation of the operation thereof are unnecessary herein.

*Description and operation of signal-modifying apparatus of Fig. 3*

The signal-modifying apparatus 16 of Fig. 3 is substantially identical to that of Fig. 1. Hence, corresponding units are indicated by the same reference numerals.

The operation of the signal-modifying apparatus 16 of Fig. 3 is substantially identical to that of Fig. 1 which, briefly considered, is that the high-frequency portion of the luminance signal is supplied through the high-pass filter network 28, the balanced modulator 29, and the high-pass filter network 30 and then supplied to the adder circuit 27 wherein it is combined with the complete luminance signal supplied through the wide band amplifier 26 to obtain a modified luminance signal wherein the amplitude of the high-frequency portion is adjusted relative to the amplitude of the low-frequency portion of the luminance signal to compensate for the previously mentioned loss of high-frequency luminance information. As before, the high-frequency portion of the luminance signal, which is translated through the balanced modulator 29, is modified thereby in accordance with the $$\left(\frac{A}{E_y'}\right)^2$$

correction signal which is developed by the divider circuit 31 and the square-law detector 32 in order to correct for the loss of high-frequency luminance information.

From the foregoing description of the invention, it will be apparent that signal-modifying apparatus constructed in accordance with the present invention has the advantage of relatively simple construction for improving the quality of the reproduced color image and may be utilized in either receiver or transmitter.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A color-television apparatus for translating a wide band luminance component and a reduced band-width chrominance component of a video-frequency composite color-television signal, which chrominance component tends to affect the reproduced luminance and thereby to degrade the fine detail of a color image when utilized in a color-television receiver together with the luminance component to reproduce the more saturated colors, comprising: a first channel for translating said luminance component; a second channel for translating the high-frequency portion of said luminance component including a modulator circuit having a controllable gain characteristic for modifying the amplitude of the high-frequency portion of said luminance component relative to the amplitude of the low-frequency portion of said luminance component; circuit means for supplying a signal representative of the amplitude of said chrominance component; a divider circuit jointly responsive to the amplitudes of said luminance and chrominance components for developing a signal representative of the ratio of the amplitudes of said components; a square-law detector responsive to said ratio signal for controlling the gain characteristic of said modulator circuit in accordance with the square of said ratio signal to modify said high-frequency portion of said luminance component in accordance with the saturation of the color; and an adding circuit for adding said high-frequency portion of said luminance-signal component translated by said second channel with said luminance component translated by said first channel to correct for the tendency to degrade the fine detail of a color image reproduced by said color receiver.

2. A color-television apparatus for translating a wide band luminance component and a reduced band-width chrominance component of a video-frequency composite color-television signal, which chrominance component tends to affect the reproduced luminance and thereby to degrade the fine detail of a color image when utilized in a color-television receiver together with the luminance component to reproduce the more saturated colors, comprising: circuit means for translating said luminance component having a controllable gain characteristic for modifying the amplitude of the high-frequency portion of said luminance component relative to the amplitude of the low-frequency portion of said luminance component; circuit means for supplying a second component of said composite color-television signal representative of the chrominance of said color image; and control-circuit means responsive to said chrominance component for controlling the gain characteristic of said first circuit means to modify said high-frequency portion of said luminance component in accordance with the saturation of the color to correct for the tendency to degrade the fine detail of a color image reproduced by said color receiver.

3. A color-television apparatus for translating a wide band luminance component and a reduced band-width chrominance component of a video-frequency composite color-television signal, which chrominance component tends to affect the reproduced luminance and thereby to degrade the fine detail of a color image when utilized in a color-television receiver together with the luminance component to reproduce the more saturated colors, comprising: a first channel for translating said luminance component; a second channel for translating the high-frequency portion of said luminance component having a controllable gain characteristic for modifying the amplitude of the high-frequency portion of said luminance component relative to the amplitude of the low-frequency portion of said luminance component; circuit means for supplying a second component of said composite color-television signal representative of the chrominance of said color image; control-circuit means responsive to said chrominance component for controlling the gain characteristic of said second channel to modify said high-frequency portion of said luminance component in accordance with the saturation of the color; and circuit means for combining said high-frequency portion of said luminance component translated by said second channel with said luminance component translated by said first channel to correct for the tendency to degrade the fine detail of a color image reproduced by said color receiver.

4. A color-television apparatus for translating a wide band luminance component and a reduced band-width chrominance component of a video-frequency composite color-television signal, which chrominance component tends to affect the reproduced luminance and thereby to degrade the fine detail of a color image when utilized in a color-television receiver together with the luminance component to reproduce the more saturated colors, comprising: a first channel for translating said luminance component; a second channel for translating the high-frequency portion of said luminance component having a controllable gain characteristic for modifying the amplitude of the high-frequency portion of said luminance component relative to the amplitude of the low-frequency portion of said luminance component; circuit means for supplying a second component of said composite color-television signal representative of the chrominance of said color image; control-circuit means responsive to said chrominance component for controlling the gain characteristic of said second channel to modify said high-frequency portion of said luminance component in accordance with the saturation of the color; and an adding circuit for adding said high-frequency portion of said luminance-signal component translated by said second channel with said luminance component translated by said first channel to correct for the tendency to degrade the fine detail of a color image reproduced by said color receiver.

5. A color-television apparatus for translating a wide band luminance component and a reduced band-width chrominance component of a video-frequency composite color-television signal, which chrominance component tends to affect the reproduced luminance and thereby to degrade the fine detail of a color image when utilized in a color-television receiver together with the luminance component to reproduce the more saturated colors, comprising: a first channel for translating said luminance component; a second channel for translating the high-frequency portion of said luminance component including a modulator circuit having a controllable gain characteristic for modifying the amplitude of the high-frequency portion of said luminance component relative to the amplitude of the low-frequency portion of said luminance component; circuit means for supplying a second component of said composite color-television signal representative of the chrominance of said color image; control-circuit means responsive to said chrominance component for controlling the gain characteristic of said modulator circuit to modify said high-frequency portion of said luminance component in accordance with the saturation of the color; and circuit means for combining said high-frequency portion of said luminance component translated by said second channel with said luminance component translated by said first channel to correct for the tency to degrade the fine detail of a color image reproduced by said color receiver.

6. A color-television apparatus for translating a wide band luminance component and a reduced band-width chrominance component of a video-frequency composite color-television signal, which chrominance component tends to affect the reproduced luminance and thereby to degrade the fine detail of a color image when utilized in a color-television receiver together with the luminance component to reproduce the more saturated colors, comprising: circuit means for translating said luminance component having a controllable gain characteristic for modifying the amplitude of the high-frequency portion of said luminance component relative to the amplitude of the low-frequency portion of said luminance component; circuit means for supplying a signal representative of the amplitude of said chrominance component; and control-circuit means responsive to the amplitude of said chrominance component for controlling the gain characteristic of said first circuit means to modify said high-frequency portion of said luminance component in accordance with the saturation of the color to correct for the tendency to degrade the fine detail of a color image reproduced by said color receiver.

7. A color-television apparatus for translating a wide band luminance component and a reduced band-width chrominance component of a video-frequency composite color-television signal, which chrominance component tends to affect the reproduced luminance and thereby to degrade the fine detail of a color image when utilized in a color-television receiver together with the luminance component to reproduce the more saturated colors, comprising: circuit means for translating said luminance component having a controllable gain characteristic for modifying the amplitude of the high-frequency portion of said luminance component relative to the amplitude of the low-frequency portion of said luminance component;

circuit means for supplying a signal representative of the amplitude of said chrominance component; and control-circuit means responsive to the amplitude of said chrominance component for controlling the gain characteristic of said first circuit means in proportion to the square of said amplitude to modify said high-frequency portion of said luminance component in accordance with the saturation of the color to correct for the tendency to degrade the fine detail of a color image reproduced by said color receiver.

8. A color-television apparatus for translating a wide band luminance component and a reduced band-width chrominance component of a video-frequency composite color-television signal, which chrominance component tends to affect the reproduced luminance and thereby to degrade the fine detail of a color image when utilized in a color-television receiver together with the luminance component to reproduce the more saturated colors, comprising: circuit means for translating said luminance component having a controllable gain characteristic for modifying the amplitude of the high-frequency portion of said luminance component relative to the amplitude of the low-frequency portion of said luminance component; circuit means for supplying a second component of said composite color-television signal representative of the chrominance of said color image; and control-circuit means nonlinearly responsive to said chrominance component for controlling the gain characteristic of said first circuit means to modify said high-frequency portion of said luminance component in accordance with the saturation of the color to correct for the tendency to degrade the fine detail of a color image reproduced by said color receiver.

9. A color-television apparatus for translating a wide-band luminance component and a reduced band-width chrominance component of a video-frequency composite color-television signal, which chrominance component tends to affect the reproduced luminance and thereby to degrade the fine detail of a color image when utilized in a color television receiver together with the luminance component to reproduce the more saturated colors, comprising: circuit means for translating said luminance component having a controllable gain characteristic for modifying the amplitude of the high-frequency portion of said luminance component relative to the amplitude of the low-frequency portion of said luminance component; circuit means for supplying a second component of said composite color-television signal representative of the chrominance of said color image; and control-circuit means jointly responsive to said luminance and said chrominance components for controlling the gain characteristic of said first circuit means to modify said high-frequency portion of said luminance componant in accordance with the saturation of the color to correct for the tendency to degrade the fine detail of a color image reproduced by said color receiver.

10. A color-television apparatus for translating a wide band luminance component and a reduced band-width chrominance component of a video-frequency composite color-television signal, which chrominance component tends to affect the reproduced luminance and thereby to degrade the fine detail of a color image when utilized in a color-television receiver together with the luminance component to reproduce the more saturated colors, comprising: circuit means for translating said luminance component having a controllable gain characteristic for modifying the amplitude of the high-frequency portion of said luminance component relative to the amplitude of the low-frequency portion of said luminance component; circuit means for supplying a second component of said composite color-television signal representative of the chrominance of said color image; and control-circuit means responsive to the ratio of said luminance and said chrominance components for controlling the gain characteristic of said first circuit means to modify said high-frequency portion of said luminance component in accordance with the saturation of the color to correct for the tendency to degrade the fine detail of a color image reproduced by said color receiver.

11. A color-television apparatus for translating a wide band luminance component and a reduced band-width chrominance component of a video-frequency composite color-television signal, which chrominance component tends to affect the reproduced luminance and thereby to degrade the fine detail of a color image when utilized in a color-television receiver together with the luminance component to reproduce the more saturated colors, comprising: circuit means for translating said luminance component having a controllable gain characteristic for modifying the amplitude of the high-frequency portion of said luminance component relative to the amplitude of the low-frequency portion of said luminance component; circuit means for supplying a second component of said composite color-television signal representative of the chrominance of said color image; a divider circuit jointly responsive to said luminance and chrominance components for developing a signal representative of the ratio of said components; and a squaring circuit responsive to said ratio signal for controlling the gain characteristic of said first circuit means in accordance with the square of said ratio signal to modify said high-frequency portion of said luminance component in accordance with the saturation of the color to correct for the tendency to degrade the fine detail of a color image reproduced by said color receiver.

12. A color-television apparatus for translating a wide-band luminance component $E_y'$ and a reduced band-width chrominance component A of a video-frequency composite color-television signal, which chrominance component A tends to affect the reproduced luminance and thereby to degrade the fine detail of a color image when utilized in a color-television receiver together with the luminance component $E_y'$ to reproduce the more saturated colors, comprising: circuit means for translating said luminance component $E_y'$ having a controllable gain characteristic for modifying the amplitude of the high-frequency portion of said luminance component $E_y'$ relative to the amplitude of the low-frequency portion of said luminance component $E_y'$; circuit means for supplying a second component A of said composite color-television signal representative of the chrominance of said color image; and control-circuit means jointly responsive to said luminance component $E_y'$ and said chrominance component A for controlling the gain characteristic of said first circuit means in accordance with the factor $$\left(\frac{A}{E_y'}\right)^2$$

to modify said high-frequency portion of said luminance component in accordance with the saturation of the color to correct for the tendency to degrade the fine detail of a color image reproduced by said color receiver.

13. A color-television apparatus for translating a wide-band luminance component $E_y'$ and a reduced band-width chrominance component A of a video-frequency composite color-television signal, which chrominance component A tends to affect the reproduced luminance and thereby to degrade the fine detail of a color image when utilized in a color-television receiver together with the luminance component $E_y'$ to reproduce the more saturated colors, comprising: first circuit means for translating said luminance component $E_y'$ having a controllable gain characteristic for modifying the amplitude of the high-frequency portion of said luminance component $E_y'$ relative to the amplitude of the low-frequency portion of said luminance component $E_y'$; circuit means for supplying a second component A of said composite color-television signal representative of the chrominance of said color image; control-circuit means jointly responsive to said luminance component $E_y'$ and said chrominance component A to develop a control signal $$\left(\frac{A}{E_y'}\right)^2$$

and circuit means for supplying said control signal $$\left(\frac{A}{E_y'}\right)^2$$

to said first circuit means for controlling the gain characteristic of said first circuit means to modify said high-frequency portion of said luminance component in accordance with the saturation of the color to correct for the tendency to degrade the fine detail of a color image reproduced by said color receiver.

14. Color-television apparatus for translating a wide band luminance signal and a reduced band-width chrominance signal, which chrominance signal tends to affect the reproduced luminance and thereby to degrade the fine detail of a color image when utilized in a color-television receiver together with the luminance signal to reproduce the more saturated colors, the apparatus comprising: circuit means for supplying a luminance signal; a luminance-signal channel for translating the luminance signal; circuit means for supplying a quadrature-modulated subcarrier frequency chrominance signal; and circuit means responsive to the amplitude of the chrominance signal for controlling the high-frequency gain characteristic of the luminance-signal channel for modifying the high-frequency portion of the luminance signal in accordance with the saturation of the color to correct for the tendency to degrade the fine detail of a color image reproduced by the color receiver.

References Cited in the file of this patent

UNITED STATES PATENTS

| | | |
|---|---|---|
| 2,635,140 | Dome | Apr. 14, 1953 |
| 2,680,147 | Rhodes | June 1, 1954 |
| 2,743,310 | Schroeder | Apr. 24, 1956 |
| 2,754,356 | Espenlaud | July 10, 1956 |

OTHER REFERENCES

Two-Color Direct-View Receiver, R. C. A., November 1949, pages 9 and 10.

Color TV, Rider Publication, March 1954, pages 141 and 142.

Introduction to Color Television, Admiral Corp., Chicago.